United States Patent

Perego et al.

[11] Patent Number: 5,359,027
[45] Date of Patent: Oct. 25, 1994

[54] PROCESS FOR THE SYNTHESIS OF LACTIC ACID POLYMERS IN THE SOLID STATE AND PRODUCTS THUS OBTAINED

[75] Inventors: Gabriele Perego, Ivrea; Enrico Albizzati, Arona, both of Italy

[73] Assignee: Himont Incorporated, Wilmington, Del.

[21] Appl. No.: 129,790

[22] Filed: Sep. 30, 1993

Related U.S. Application Data

[63] Continuation of Ser. No. 837,513, Feb. 18, 1992, abandoned.

[30] Foreign Application Priority Data

Feb. 21, 1991 [IT] Italy ............................ MI91A000450

[51] Int. Cl.$^5$ ............................................. C08G 63/08
[52] U.S. Cl. .................................... 528/354; 525/415; 525/450; 528/357; 528/361
[58] Field of Search ................ 525/415, 450; 528/354, 528/357, 361

[56] References Cited

U.S. PATENT DOCUMENTS

| | | | |
|---|---|---|---|
| 4,273,920 | 6/1992 | Nevin | 528/361 |
| 4,644,038 | 2/1987 | Protzman | 525/412 |
| 4,677,191 | 6/1987 | Tanaka et al. | 528/361 |
| 4,849,228 | 7/1989 | Yamamoto et al. | 528/354 X |
| 4,960,866 | 10/1990 | Bendix et al. | 528/499 |

FOREIGN PATENT DOCUMENTS 0171907 3/1985 European Pat. Off. .

*Primary Examiner*—Morton Foelak
*Assistant Examiner*—Shelley A. Dodson

[57] ABSTRACT

Polymers and copolymers of L(+) and D(−) lactic acid, with high molecular weight and in the absence of catalysts, are prepared by upgrading low molecular weight polymers in the solid state.

5 Claims, No Drawings

PROCESS FOR THE SYNTHESIS OF LACTIC ACID POLYMERS IN THE SOLID STATE AND PRODUCTS THUS OBTAINED

This application is a continuation of application Ser. No. 07/837,513, filed Feb. 18, 1992, now abandoned.

BACKGROUND OF THE INVENTION

The present invention concerns a process for the preparation, by way of upgrading in the solid state, of L(+) and/or D(−) lactic acid polymers or copolymers, in the absence of catalysts, and the products thus obtained.

At present, there is a growing interest toward biodegradable polymer materials, for which there is an increased demand, both as replacement for non-biodegradable thermoplastic polymers in their most common uses, and for particularly specialized applications, such as the gradual or controlled release of medicaments into the human and animal bodies, the manufacturing of bioabsorbable prostheses, or, in the agricultural field, the controlled release of insecticides.

All these applications require complete biodegradability of the polymers. Moreover, the degradation of the polymers must result in nontoxic compounds, and this is a particularly important aspect in the field of biomedical applications.

A monomer which is particularly suitable for the preparation of biodegradable polymers to be used in the biomedical field as well as the other ones mentioned above, is lactic acid, both in the L(+) and D(−) form. Its production is carried out microbiologically, by properly fermenting wheat starch, glucose and carbohydrates in general, under anaerobic conditions. Depending on the bacterial base used for the fermentation, one can obtain either L(+) or D(−) lactic acid.

It is already known to prepare lactic acid polymers after previous cyclodimerization of the monomer (with the formation of lactide) and polymerization by opening the lactide ring with appropriate catalysts.

The lactide is obtained by a laborious and costly procedure, which generally consists of the production of lactic acid oligomers by polycondensation, and then distillation of the lactide produced by way of depolymerization, operating at high temperatures and under vacuum, generally in the presence of a catalyst (for example ZnO). Said distillation usually takes place with increasing slowness, due to the gradual release of lactide by the viscous mass during the course of the depolymerization.

The lactide must be brought to a high level of purity by way of consecutive recrystallizations and must be thoroughly dried under vacuum, since residual lactic acid or humidity inhibit the subsequent polymerization which follows. Normally, for this purpose, various recrystallization procedures are carried out in solvents such as ethyl acetate, methyl isobutyl ketone and toluene, followed by drying.

As previously stated, one obtains the final polymer from the lactide thus prepared and purified, through polymerization by ring opening by means of appropriate catalysts. Examples of such catalysts are: Sn octanoate, Zn stearate, Sb octanoate, MgO, SnO, $Sb_2O_3$, $CF_3SO_3H$, $C_1SO_3H$, $Ti(O-nBu)_4$, $(nBu)_2Sn(OMe)_2$, $AlCl_3$, $FSO_3H$, $BF_3ET_2O$ and $FeCl_3$; where nBu is normally butyl and Me methyl.

The synthesis, purification, and polymerization procedure of lactide is described in various ways in chemical literature, as for example, in U.S. Pat. No. 4,057,537; published European patent application No. 261,572; Polymer Bulletin 14, 491–495 (1985); and Makromol. Chem. 187, 1611–1625 (1986).

The great complexity and high cost of the above mentioned process for the manufacture of the poly(lactic acid) by way of synthesis of the lactide, is the main reason for the modest industrial development of this material. In fact, great disadvantages, among other things, are the slow rate of distillation of the lactide (which depends on the kinetics of depolymerization of the oligomer), the cost connected with the necessary recrystallizations and recovery of related solvents, the high degree of purity and anhydrousness necessary for the catalytic polymerization by opening the ring, and the highly viscous polymer mass obtained which needs additional grinding.

Moreover, regarding the applications in the biomedical field, both in terms of controlled medicament release and the manufacture of bioabsorbable prosthesis, it is very important to reduce the quantity of catalyst residues present in the polymer. In fact, said residues can present toxicological problems, so that they often need to be eliminated by way of a purification process.

Published German patent application No. 3641692 teaches a purification process based on the extraction, in water, of the tin present in the lactic acid polymers as catalyst residue. This process allows one to reduce the tin content in the polymer to less than 2 ppm.

However, extraction in water involves the degradation of the polymer treated (by hydrolysis), which increases as the catalyst residue concentrations decrease.

At any rate, no method of extraction with solvents can lead to complete purification, since an exchange equilibrium of the substances extracted takes place between the extracting phase and the phase which undergoes extraction.

This invention provides a process for the synthesis of homopolymers or copolymers of L(+) and/or D(−) lactic acid, comprising upgrading, by way of heating in an inert atmosphere, or under vacuum, low molecular weight homopolymers or copolymers of L(+) and/or D(−) lactic acid, in the form of powder or particles (i.e., granules having diameters up to a few millimeters) and having a crystallinity equal to or greater than 10% as determined by X-ray diffraction, said upgrading being carried out at temperatures higher than the glass transition temperature of the polymer and lower than its melting temperature. As will appear from the following description, the term "upgrading" is used herein to indicate that the molecular weight is increased by operating under the above described conditions.

Said process presents obvious advantages compared to polymerization by means of catalysts, because of its utmost simplicity and economy.

Moreover, since the low molecular weight copolymers to be subjected to upgrading can be prepared by polycondensation of the monomers in the absence of catalysts, the process of the present invention allows one to obtain polymers totally free of catalyst residues, and, in particular, free of heavy metals originating from the catalysts more commonly used.

The absence of these catalyst residues is of particular importance in the pharmaceutical and biomedical field, in relation, for example, to the controlled release of medicaments and to the manufacturing of bioabsorbable prosthesis. In these cases the absence of heavy metals, or catalyst residues in general, confers important nontoxic characteristics to the materials thus making it possible to broaden their use.

As previously stated, the low molecular weight polymers which can be upgraded by the process of the present invention are in form of powder or particles, having a crystallinity of at least 10% as determined by X-ray diffraction. Preferably, the crystallinity is from 10% to 90%.

Said low molecular weight polymers can be prepared by polycondensation in the absence of catalysts, using known methods, such as, for example, in solution, or in the molten state in the absence of solvents.

The polycondensation in solution is carried out by using solvents which are capable of dissolving the monomers and/or the polymer which is being formed. One can use, for example, solvents such as benzene, toluene, o-xylene, m-xylene, p-xylene, or mixtures of the same; particularly useful is the commercial mixture of xylene isomers.

The solution is brought to the boiling point and kept boiling for the period of time needed to complete the polycondensation.

Normally the solvents are used, at the same time, as a vehicle to remove the water from the reaction system, for example by way of azeotropic distillation, thus bringing the reaction equilibrium towards higher molecular weights. In general one uses controlled quantities of solvents. In the case of xylene, for example, the solutions prepared contain a concentration of about 50% by weight.

Frequently water is present from the beginning, since one usually uses aqueous solutions of lactic acid at about 90% by weight, and is further produced during the polycondensation reaction.

At the end of the reaction, i.e. when there is no more water coming from the polycondensation, the polymer can be recovered by precipitation with a proper solvent, such as methanol or ethanol, for example. In this case the polymer obtained is in the form of a very fine powder and therefore can be used directly for the upgrading operation which follows. However, one can recover the polymer by removing the solvent through distillation, at first at ambient pressure and afterwards at reduced pressure. In this case one obtains a compact polymer mass, which necessitates further grinding. Nevertheless, the latter phase does not present any technical difficulties or particular operational expenses, due to the considerable fragility of the material. Advantages of polycondensation in solution are the easy removal of the water present and the high monomer conversion.

The polycondensation in the molten state is normally carried out by heating the monomers at temperature from 100° C. to 250° C., preferably from 120° C. to 200° C., while at the same time removing the water by distillation at ambient pressure. Consequently, the polymer can be isolated from the nonreacted substances and reaction by-products (lactides) by way of reduced pressure distillation.

The above mentioned method produces a product in the form of a solid mass, which must then be reduced to powder or particles in order to carry out the upgrading operation.

As already mentioned, the operation can be carried out either by grinding, using common apparatuses for grinding polymers and sieving the powders, or by precipitating the polymer from its solution with appropriate nonsolvents.

With the above mentioned polycondensation methods one can prepare L(+) or D(−) lactic acid homopolymers, as well as polymers with other hydroxyacids, which can be introduced also in the form of lactones.

The chemical environment of the polycondensation, allowing the hydrolysis of the esters, favors the establishment of an equilibrium between the cyclic lactone form and the open form of the hydroxy acid, making it possible to use the lactones as comonomers. Examples of lactones which can be used in the synthesis of copolymers are: β-propiolactone, δ-valerolactone, ε-caprolactone, glycolide, D, L-lactide, and δ-butyrolactone.

When one uses a mixture of monomers comprising L(+) or D(−) lactic acid and D, L-lactide for the polycondensation, the polymer obtained contains both lactic acid enantiomers.

The quantity of comonomers present in the low molecular weight copolymer to be subjected to upgrading must be such that said copolymer will show a crystallinity higher than or equal to 10% as determined by X-ray diffraction. Said quantity, depending mainly on the type of comonomers, is generally less than or equal to 30% in moles.

The viscosimeter average molecular weights of the polymers and copolymers that can be obtained with the above mentioned polycondensation methods are generally from about 500 to 10,000. However, to carry out the upgrading according to the process of the present invention, one can use any lactic acid polymer, even with a viscosimeter average molecular weight greater than 10,000, as long as it has the above mentioned crystallinity, and it has been obtained by a synthetic process that leaves the terminal functional groups unaltered, or that is followed by steps that restore said functional groups.

The molecular weights are further increased by the upgrading.

The particle size of the powder or particles of low molecular weight polymer to be subjected to upgrading is not particularly critical; by way of example one can use powders or particles having an individual particle diameter from 5 μm to 5 mm.

The upgrading is carried out by heating the powder or particles of low molecular weight polymer or copolymer at temperatures higher than the glass transition temperature (Tg) of the polymer, and lower that its melting temperature. The operation is carried out under vacuum or in an inert gas atmosphere.

It is preferable to maintain the temperature at least 1° to 20° C. above the Tg, and from 1° to 40° C. under the melting temperature, depending on the span between Tg and melting temperature.

Moreover, since, as previously stated, the polymers to be subjected to upgrading may also have relatively low crystallinity, it is preferable to maintain the temperature from 1° to 40° C., more preferably from 1° to 20° C. below the caking temperature of the polymer powder or particles.

In the case of highly crystalline polymers, the caking temperature is close to the melting one, and in fact it may be considered practically indentical, while in the case where significant quantities of amorphous polymer are present, the caking temperature more or less coincides with the softening temperature.

As the upgrading progresses, the caking temperature tends to increase, particularly in the case of low crystalline polymers, so that the temperature used can also be progressively increased, continuously or discontinuously, during the process, thus maintaining a difference of a few degrees between the caking and the upgrading temperatures.

The upgrading can be carried out under static or dynamic vacuum, or in anhydrous inert gas current.

The vacuum applied can be from 0,001 Torr to 50 Torr, and preferably from 0.001 Torr to 10 Torr. There is no lower limit for the vacuum applied, except with respect to the ecomony of the technical operation, since the lower the pressure of the reactor, the better the upgrading.

When the upgrading is carried out by way of an anhydrous inert gas flow, the gas used can be selected from nitrogen, argon, helium, neon, krypton, xenon and carbon dioxide. Mixtures of the above mentioned gases can also be used, but a general condition for their use is that they must be anhydrous.

The inert gas flow used can be preheated in order to facilitate maintaining the entire polymer sample at the predetermined temperature. Preheating the gas, moreover, supplies the necessary heat for the entire polymer mass whenever the upgrading is carried out on a considerable quantity of material.

The length of the upgrading process depends on the initial molecular weight of the polymer used, its specific physical form, particle size in particular, operational conditions and apparatus used.

Different methods for the determination of the optimum length of the reaction may consist of a number of polymer samplings, conducted from time to time, subjected to physical or chemical measurements which can be compared to the molecular weight and its increase. Measurements which can be carried out for this specific purpose are, for example, the determination of molecular weight by viscosimeter or G.P.C., melt flow index, melt temperature, and terminal carboxylic groups by way of titration.

In every case one arrives at a point where the parameter measured remains practically constant. At this point the upgrading process can be considered finished.

As a way of example, the upgrading times starting with polymers having viscosimeter average molecular weight from 500 to 10,000 are of the order of from 100 to 200 hours.

The molecular weights of the polymers obtained by way of upgrading by the process of the present invention depend, among other things, on the molecular weight of the starting polymer. For example, subjecting polymers with viscosimeter average molecular weight from 500 to 10,000 to upgrading, one can easily obtain final polymers with viscosimeter average molecular weight up to 50,000.

The following examples are given to illustrate and not limit the present invention.

EXAMPLE 1

Polycondensation of L(+) lactic acid in solution

In a 500 ml flask with two necks are introduced 100 g of a 90% by weight solution in water of L(+) lactic acid, and 100 ml xylene. The flask is equipped with thermometer and azeotropic distillation apparatus, and the mixture is agitated vigorously for 56 hours, after which no more water is produced by the reaction system. The final temperature of the reaction mixture, which increases progressively as the water is removed, is 146° C. Under these conditions the system is homogeneous and clear. After cooling, the poly(L(+) lactic acid) (I) is separated as an opaque white material. Then, the liquid phase is settled and no more precipitation occurs when methanol is added. The solid part is dispersed in 300 ml of methanol and agitated cold for 4 hours. Afterward it is filtered, washed with methanol, and dried with a mechanical pump.

The low molecular weight poly(L(+) lactic acid) thus prepared is then held under nitrogen. 40 g of polymer having an inherent viscosity equal to 0.17 dl/g and a crystallinity of 55% (measured with X-ray diffraction) are obtained.

The physical aspect of the polymer is that of a homogeneous powder with average particle diameter of about 17 μm. The dimension of the average diameter is obtained from sedimentation velocity measurements.

The properties of the product are shown on Table 1.

Upgrading 1.0 g of poly(L(+) lactic acid) (I) obtained as described above are introduced in a 10 ml test-tube.

Said test-tube is placed in an aluminum oven heated by electric elements, whose temperature is controlled by a thermocouple. A vacuum is then applied three times (0.1 Torr) alternating with anhydrous nitrogen atmosphere, and then a constant static vacuum of 0.1 Torr is applied while slowly increasing the temperature from 130° C. to 170° C.

The temperature increase is made possible by the gradual increase in the melting temperature. The reaction is controlled by sampling the polymer regularly, and measuring its melting temperature. The reaction is considered complete when the melting temperature is constant with time, which in this specific case is after 240 hours. In this manner, a poly(L(+) lactic acid) (II) is obtained, having an inherent viscosity of 0.89 dl/g. The viscosities in this example, as in the following one, is measured in chloroform at 25° C.

The main chemical-physical measurements are shown in Table 1.

EXAMPLE 2

In a 10 ml vertical glass reactor equipped, at the lower end, with an opening for the flow of gas, are introduced 1.0 g of poly(L(+) lactic acid) (I) obtained as described in Example 1.

Afterward, a flow of 45 ml/min of anhydrous nitrogen is introduced from the bottom, and the entire reactor is immersed in a thermoregulated oil bath. The inert gas flow is preheated by passing it through a serpentine immersed in the same oil bath, and its flow is regulated by a flowmeter positioned on the line and previously calibrated with a bubble flowmeter. The predetermined temperature is controlled by a thermocouple inserted in the polymer sample. The reaction is controlled by regularly sampling the polymer, and measuring the melting temperature. The temperatures are from 130° C. to 168° C. with a progressive increase which is made possible by the gradual increase of the melting temperature of the material. The reaction is considered complete when the melting temperature of the material is constant with time, which in this specific case is after 240 hours. In this manner, a poly(L(+) lactic acid) (III) is obtained, having an inherent viscosity of 0.62 dl/g. The main chemical-physical measurements are shown in Table 1.

TABLE 1

| Sample | I | II | III |
|---|---|---|---|
| Upgrading | — | vacuum | nitrogen |
| Inherent viscosity dl/g | 0.17 | 0.89 | 0.62 |
| Average molecular weight by viscosimeter | 2600 | 25000 | 15400 |
| Melt temperature °C. | 140 | 180 | 176 |
| Tg °C. | 45 | 57 | 58 |
| Upgrading hours | — | 240 | 240 |

Remarks

The average molecular weight by viscosimeter ($\overline{M}v$) is calculated according to the formula:

$$\eta_{inh} = 5.45 \times 10^{-4} \overline{M}v^{0.73}$$

where $\eta_{inh}$ = inherent viscosity;

Melt temperature and Tg are calculated by way of DSC.

Other features, advantages and embodiments of the invention disclosed herein will be readily apparent to those exercising ordinary skill after reading the foregoing disclosure.

In this regard, while specific embodiments of the invention have been described in considerable detail, variations and modifications of these embodiments can be effected without departing from the spirit and scope of the invention as described and claimed.

We claim:

1. A process for increasing the molecular weight of a polymer selected from the group consisting of solid homopolymers and copolymers of L(+) and D(−) lactic acids, which homopolymers and copolymers have average molecular weight by viscosimeter from 500 to 10,000, and x-ray diffraction crystallinity of at least 10%, said process comprising heating said polymer (a) in powder or particle form, (b) in the absence of a solvent or other liquid, (c) in a vacuum or anhydrous gas current, and (d) at a temperature higher than the glass transition temperature of the polymer, but lower than its melting temperature.

2. The process of claim 1 in which said copolymers are copolymers of L(+) and D(−) lactic acids and one or more of β-propiolactone, δ-valerolactone, e-caprolactone, glycolide, D, L-lactide, and δ-butyrolactone.

3. The process of claim 1, where the polymer is obtained by polycondensation in the absence of a catalyst.

4. The process of claim 1, where said temperature is maintained from 1° C. to 40° C. below the polymer melting temperature.

5. The process of claim 1, where said temperature is maintained from 1° C. to 20° C. under the caking temperature of the polymer powder or particles.

* * * * *